United States Patent
Saito et al.

(10) Patent No.: US 10,465,608 B2
(45) Date of Patent: Nov. 5, 2019

(54) TEMPERATURE CONTROL DEVICE, GAS TURBINE, TEMPERATURE CONTROL METHOD, AND PROGRAM

(71) Applicant: MITSUBISHI HITACHI POWER SYSTEMS, LTD., Kanagawa (JP)

(72) Inventors: Akihiko Saito, Tokyo (JP); Takashi Sonoda, Tokyo (JP); Tetsuya Yabe, Tokyo (JP); Satoko Fujii, Tokyo (JP); Kazuya Higashi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 830 days.

(21) Appl. No.: 15/031,089

(22) PCT Filed: Oct. 21, 2014

(86) PCT No.: PCT/JP2014/077991
§ 371 (c)(1),
(2) Date: Apr. 21, 2016

(87) PCT Pub. No.: WO2015/064428
PCT Pub. Date: May 7, 2015

(65) Prior Publication Data
US 2016/0237910 A1 Aug. 18, 2016

(30) Foreign Application Priority Data
Oct. 29, 2013 (JP) .................. 2013-224252

(51) Int. Cl.
*F02C 7/18* (2006.01)
*F04D 27/00* (2006.01)
(Continued)

(52) U.S. Cl.
CPC ................ *F02C 7/185* (2013.01); *F02C 9/18* (2013.01); *F04D 27/006* (2013.01);
(Continued)

(58) Field of Classification Search
CPC .......... F02C 7/185; F02C 9/18; F04D 27/006; F04D 27/0246; F05D 2220/30; F05D 2270/303
(Continued)

(56) References Cited

U.S. PATENT DOCUMENTS

2004/0011050 A1* 1/2004 Inoue ....................... F02C 3/22
60/773
2004/0112037 A1* 6/2004 Yagi ....................... F01D 15/10
60/39.3
(Continued)

FOREIGN PATENT DOCUMENTS

JP 2-23212 1/1990
JP 3849473 11/2006
(Continued)

OTHER PUBLICATIONS

Written Opinion of the International Searching Authority dated Jan. 27, 2015 in International Application No. PCT/JP2014/077991 (with English translation).
(Continued)

*Primary Examiner* — John H Le
(74) *Attorney, Agent, or Firm* — Wenderoth, Lind & Ponack, L.L.P.

(57) ABSTRACT

A temperature control device includes a temperature difference calculation unit that calculates a temperature difference between an inlet and an outlet of a boost compressor on the basis of a pressure ratio of the inlet and the outlet of the boost compressor and an IGV opening degree of the boost compressor, the boost compressor outputting cooling air obtained by cooling compressed air from a compressor to a cooling target; a temperature information calculation unit that calculates temperature information for feedback control for at least one of the inlet and the outlet of the boost compressor on the basis of the temperature difference
(Continued)

between the inlet and the outlet of the boost compressor; and a control unit that performs feedback control by using the temperature information for feedback control such that at least one of an inlet temperature and an outlet temperature of the boost compressor approaches a setting value.

8 Claims, 7 Drawing Sheets

(51) Int. Cl.
*F02C 9/18* (2006.01)
*F04D 27/02* (2006.01)

(52) U.S. Cl.
CPC ...... *F04D 27/0246* (2013.01); *F05D 2220/30* (2013.01); *F05D 2270/303* (2013.01)

(58) Field of Classification Search
USPC ......... 702/130; 60/39.3, 772, 773, 775, 777, 60/272; 701/103
See application file for complete search history.

(56) References Cited

U.S. PATENT DOCUMENTS

| | | | | |
|---|---|---|---|---|
| 2004/0177618 A1* | 9/2004 | Placko | ................... | F02C 3/305 |
| | | | | 60/775 |
| 2005/0172612 A1 | 8/2005 | Yamanaka et al. | | |
| 2007/0028625 A1* | 2/2007 | Joshi | ....................... | F23C 13/04 |
| | | | | 60/777 |
| 2007/0193249 A1 | 8/2007 | Takashima et al. | | |
| 2009/0198432 A1* | 8/2009 | Tabata | .................... | F02D 23/02 |
| | | | | 701/103 |
| 2014/0083108 A1* | 3/2014 | Kunihiro | ................. | F01K 19/10 |
| | | | | 60/772 |

FOREIGN PATENT DOCUMENTS

| | | |
|---|---|---|
| JP | 2007-211705 | 8/2007 |
| JP | 2010-90817 | 4/2010 |
| JP | 2013-92112 | 5/2013 |

OTHER PUBLICATIONS

International Search Report dated Jan. 27, 2015 in International Application No. PCT/JP2014/077991.

* cited by examiner

TEMPERATURE CONTROL DEVICE, GAS TURBINE, TEMPERATURE CONTROL METHOD, AND PROGRAM

TECHNICAL FIELD

The present invention relates to a temperature control device, a gas turbine, a temperature control method, and a program.

Priority is claimed on Japanese Patent Application No. 2013-224252, filed Oct. 29, 2013, the content of which is incorporated herein by reference.

BACKGROUND ART

A method of extracting some of the air compressed in a gas turbine compressor, cooling the air by a cooler, boosting the air by a boost compressor, and using the air as cooling air is known in order to cool high temperature components such as a gas turbine combustor, a turbine blade, and the like.

For example, Patent Citation 1 discloses that it is necessary to boost the air discharged from the compressor by the boost compressor, in a closed cooling type gas turbine which collects, in the combustor, cooling air used for cooling high temperature parts of a turbine and uses the air as combustion air. In addition, Patent Citation 1 also discloses that if the boost compressor boosts the coo hug air, the temperature of the cooling air is increased, and thus, a cooler for causing the temperature of the cooling air to be an appropriate temperature is provided.

CITATION LIST

Patent Literature

[Patent Citation 1] Japanese Patent No. 3849473

SUMMARY OF INVENTION

Technical Problem

In a case where bleed air from the gas turbine compressor is cooled by the cooler and boosted by the boost compressor to be used as the cooling air, it is necessary to perform temperature control of an inlet or an outlet of the boost compressor. In a case where the temperature of the cooling air (an outlet temperature of the boost compressor) is higher than a specified temperature, the high temperature components cannot be sufficiently cooled and thus the devices may be damaged. In addition, in a case where an inlet temperature of the boost compressor is higher than a specified temperature, the temperature exceeds a temperature allowable for downstream devices or pipes, and thus the devices may be damaged. In contrast, in a case where the inlet temperature of the boost compressor is too low, condensed water is generated, and thus the boost compressor, the downstream devices, or the pipes may be damaged.

However, in a case where the outlet temperature of the boost compressor s controlled, response becomes slow due to the influence of the volume of the pipe or the like, and thus the control may not be accurately performed. In addition, in a case where the inlet temperature of the boost compressor is controlled, the temperature of the cooling air is changed by the compression in the boost compressor, and thus the control may not be accurately performed.

The invention provides a temperature control device, a gas turbine, a temperature control method, and a program in which it is possible to accurately perform temperature control at the time of obtaining cooling air by boosting compressed air from a compressor, such as bleed air from a gas turbine compressor, by a boost compressor after cooling using a cooler.

Solution to Problem

According to a first aspect of the invention, there is provided a temperature control device including: a temperature difference calculation unit that calculates a temperature difference between an inlet and an outlet of a boost compressor on the basis of a pressure ratio of the inlet and the outlet of the boost compressor and an IGV opening degree of the boost compressor, the boost compressor outputting cooling air obtained by cooling compressed air from a compressor to a cooling target; a temperature information calculation unit that calculates temperature information for feedback control for at least one of the inlet, and the outlet of the boost compressor on the basis of the temperature difference between the inlet and the outlet of the boost compressor; and a control unit that performs feedback control by using the temperature information for feedback control such that at least one of an inlet temperature and an outlet temperature of the boost compressor approaches setting value.

The temperature information calculation unit may calculate an inlet temperature setting value of the boost compressor on the basis of an outlet temperature setting value of the boost compressor and the temperature difference between the inlet and the outlet of the boost compressor, and the control unit may perform feedback control such that the inlet temperature of the boost compressor approaches the setting value.

The temperature information calculation unit may calculate the outlet temperature of the boost compressor on the basis of an inlet temperature measurement value of the boost compressor and the temperature difference between the inlet and the outlet of the boost compressor, and the control unit may perform feedback control such that the outlet temperature of the boost compressor calculated by the temperature information calculation unit approaches the setting value.

The temperature control device may further include a correction value generation unit that generates a correction value for a control command value which is output from the control unit, on the basis of information indicating an operation status of the compressor; and an operation-status correspondence correction unit that corrects the control command value by using the correction value.

The temperature control device may further include a predetermined value output unit that outputs a predetermined value in a case where a surge avoidance control command of the boost compressor is acquired; and a surge avoidance correction unit that corrects the control command value by using the predetermined value.

According to a second aspect of the invention, there is provided a gas turbine including any one of the temperature control devices described above.

According to a third aspect of the invention, there is provided a temperature control method including: a temperature difference calculation step of calculating a temperature difference between an inlet and an outlet of a boost compressor on the basis of a pressure ratio of the inlet and the outlet of the boost compressor and an IGV opening degree of the boost compressor, the boost compressor outputting cooling air obtained by cooling compressed air from a compressor to a cooling target; a temperature information calculation step of calculating temperature information for feedback control for at least one of the inlet and the outlet of the boost compressor on the basis of the temperature difference between the inlet and the outlet of the boost compressor; and a control step of performing feedback control by using the temperature information for feedback control such that at least one of an inlet temperature and an outlet temperature of the boost compressor approaches a setting value.

According to a fourth aspect of the invention, there is provided a program causing a computer to execute: a temperature difference calculation step of calculating a temperature difference between an inlet and an outlet of a boost compressor on the basis of a pressure ratio of the inlet and the outlet of the boost compressor and an IGV opening degree of the boost compressor, the boost compressor outputting cooling air obtained by cooling compressed air from a compressor to a cooling target; a temperature information calculation step of calculating temperature information for feedback control for at least one of the inlet and the outlet of the boost compressor on the basis of the temperature difference between the inlet and the outlet of the boost compressor; and a control step of performing feedback control by using the temperature information for feedback control such that at least one of an inlet temperature and an outlet temperature of the boost compressor approaches a setting value.

Advantageous Effects of Invention

According to the temperature control device, the gas turbine, the temperature control method, and the program, it is possible to more accurately perform temperature control at the time of obtaining cooling air by boosting compressed air from a compressor such as a gas turbine compressor, by a boost compressor after cooling using a cooler.

EMBODIMENTS FOR CARRYING OUT THE INVENTION

Hereinafter, embodiments of the invention are described, but the following embodiments are not intended to limit the inventions according to claims. In addition, all the characteristic combinations described in the embodiments are not essential to the solution of the invention.

First Embodiment

Figure 1:
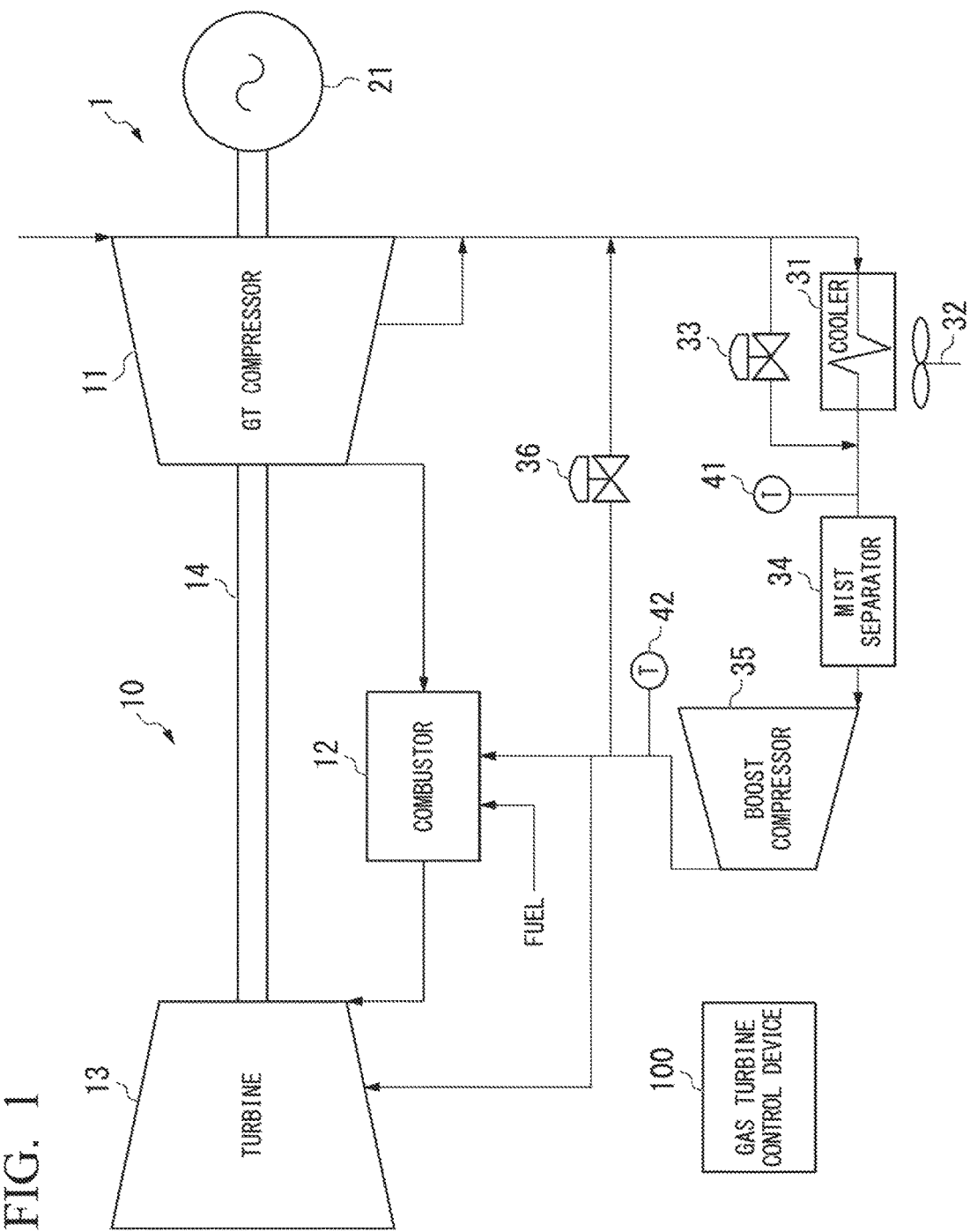
FIG. 1 is a schematic configuration diagram illustrating an example of a configuration of a gas turbine plant according to a first embodiment of the invention.

FIG. 1 is a schematic configuration diagram illustrating an example of a configuration of a gas turbine plant according to a first embodiment of the invention. In FIG. 1, a gas turbine plant 1 includes a gas turbine 10, a generator 21, a cooler 31, a fan 32, a cooler bypass valve 33, a mist separator 34, a boost compressor (BC) 35, an anti-surge valve 36, a cooler-outlet thermometer 41, and a BC-outlet thermometer 42. The gas turbine 10 includes a GT (Gas Turbine) compressor 11, a combustor 12, a turbine 13, a shaft 14, and a gas turbine control device 100.

The gas turbine plant 1 performs power generation by using rotational force obtained by combusting fuel gas.

However, as the gas turbine plant 1, various plants can be used as long as the plant is a gas turbine plant in which cooling an is compressed by the boost compressor. For example, the gas turbine plant 1 may be a simple gas turbine power generation plant or a combined cycle power generation plant. In addition, the gas turbine plant 1 may be a gas turbine plant other than those for power generation such as a gas turbine plant for power.

Furthermore, the plant according to the embodiment is not limited to the gas turbine plant, and various plants can be adopted in which a boost compressor compresses cooling air obtained by cooling compressed air from a compressor. In addition, the plant according to the embodiment is not limited to a plant in which bleed air from a compressor is cooled and is compressed by a boost compressor. For example, the plant according to the embodiment may adopt a configuration in which the entirety of compressed air from a compressor is cooled and is compressed by a boost compressor.

In the gas turbine 10, the GT compressor 11 compresses outside air to supply compressed air to the combustor 12. In addition, some of the compressed air generated by the GT compressor 11 is output to the cooler 31 so as to be used for generating cooling air. The GT compressor 11 corresponds to an example of a compressor.

The combustor 12 performs combustion by mixing fuel with the compressed air supplied from the GT compressor 11 to generate combustion gas, and supplies the generated combustion gas to the turbine 13. The turbine 13 is driven to rotate by using the combustion gas supplied from the combustor 12 as working gas. The shaft 14 couples the GT compressor 11, the turbine 13, and the generator 21 together, and transmits rotational force generated by the turbine 13 to the GT compressor 11 and the generator 21.

The generator 21 is rotated by the rotational force generated by the turbine 13 to perform power generation.

The cooler 31 cools the compressed air extracted from the GT compressor 11.

The fan 32 blows air to the cooler 31 in order to cool the compressed air. The air flow rate can be adjusted by changing the rotational speed of the fan 32, and it is possible to change an inlet temperature of the boost compressor 35 (the temperature of air flowing into the boost compressor 35) or an outlet temperature of the boost compressor 35 (the temperature of air (that is, cooling air) flowing out from the boost compressor 35).

In addition, the method of cooling the compressed air by the cooler 31 is not limited to the air cooling method and various methods can be used. For example, the cooler 31 may cool the compressed air by water cooling.

The cooler bypass valve 33 adjusts the bypass flow rate of the compressed air from the GT compressor 11 which directly flows to the mist separator 34 as the subsequent stage of the cooler 31 without passing through the cooler 31. By changing the bypass flow rate, the inlet temperature of the boost compressor 35 or the outlet temperature of the boost compressor 35 can be changed. Specifically, as the bypass flow rate becomes greater, the inlet temperature or the outlet temperature of the boost compressor 35 becomes higher.

The mist separator 34 removes moisture from the air flowing into the boost compressor 35. However, a case is considered in which if moisture in air is increased, the mist separator 34 may not completely remove the moisture. Therefore, in order to prevent condensation in the boost compressor 35 or at the subsequent stage, it is necessary to perform temperature control such that the inlet temperature or the outlet temperature of the boost compressor 35 does not become too low.

The boost compressor 35 outputs cooling air obtained by cooling extracted air from the GT compressor 11, to a cooling target. Specifically, the boost compressor 35 compresses the air, which is output from the cooler 31 and passes through the mist separator 34, to generate the cooling air for cooling high temperature components, and supplies the cooling air to the combustor 12 and the turbine 13 which have the high temperature components.

The anti-surge valve 36 adjusts the air flow rate from the outlet side of the boost compressor 35 to the inlet side of the cooler bypass valve 33. In a case where a surge is about to occur due to the reduction of the air flow rate of the boost compressor 35, the anti-surge valve 36 increases the air flow rate (specifically, a control unit 116 increases the opening degree of the anti-surge valve 36) so that the air flow rate of the boost compressor 35 is increased, and thus it is possible to prevent a surge.

The cooler-outlet thermometer 41 measures an outlet temperature of the cooler. The outlet temperature of the cooler herein means a temperature of the air at the outlet of the cooler 31. Since the temperature change of the air by passing through the mist separator 34 is small, the outlet temperature of the cooler is regarded as an inlet temperature of the boost compressor. The inlet temperature of the boost compressor herein means a temperature of the air at the inlet of the boost compressor 35.

The BC-outlet thermometer 42 measures an outlet temperature of the boost compressor. The outlet temperature of the boost compressor herein means a temperature of the air at the outlet of the boost compressor 35 (that is, the temperature of the cooling air to be supplied to the combustor 12 and the turbine 13).

The gas turbine control device 100 controls each device of the gas turbine plant 1. Especially, the gas turbine control device 100 controls each device such as the fan 32 or the cooler bypass valve 33, which adjusts the temperature of the cooling air. The gas turbine control device corresponds to an example of a temperature control device. Hereinafter, the devices that adjust the temperature of the cooling air are referred to as "temperature control operation terminals".

Figure 2:
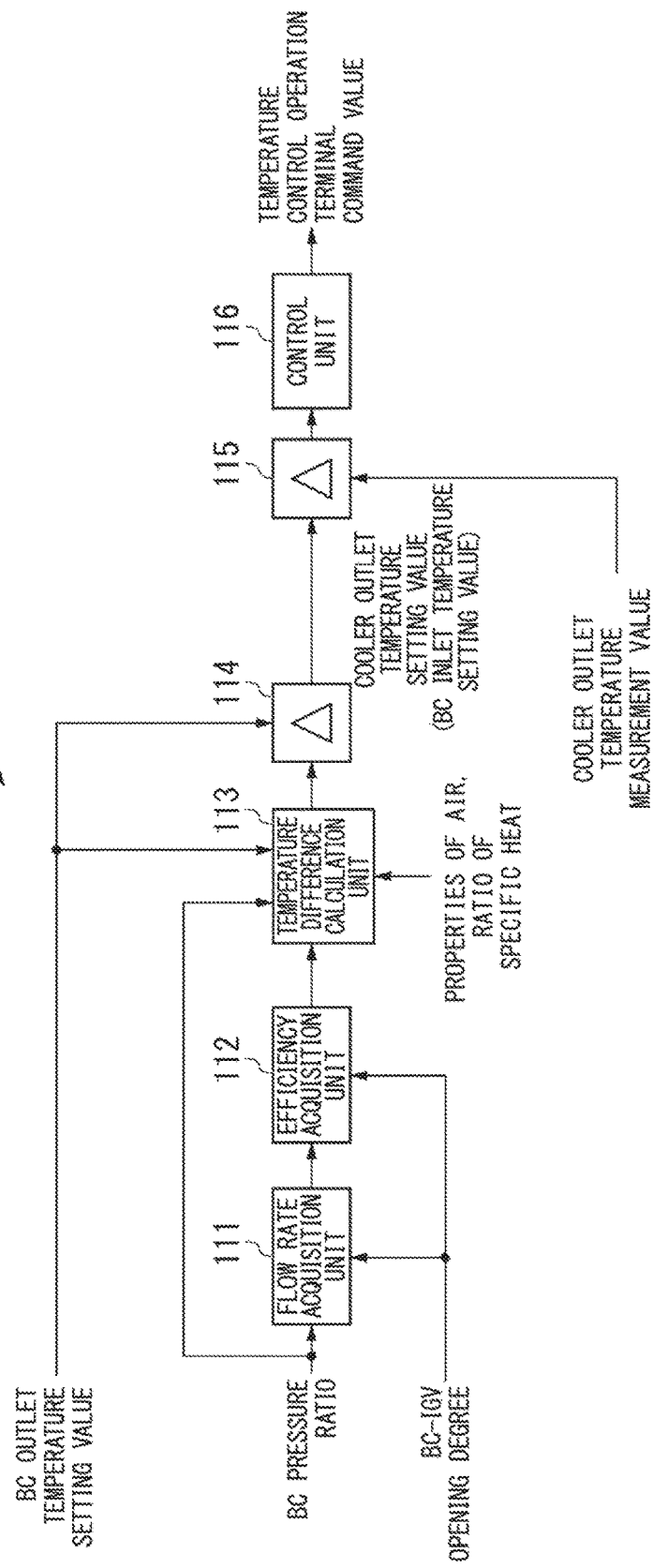
FIG. 2 is a schematic block diagram illustrating a configuration of a part for performing temperature control at the time of obtaining cooling air in the gas turbine control device according to the first embodiment.

FIG. 2 is a schematic block diagram illustrating a configuration of a part for performing temperature control at the time of obtaining cooling air in the gas turbine control device 100. In FIG. 2, the gas turbine control device 100 includes a flow rate acquisition unit 111, an efficiency acquisition unit 112, a temperature difference calculation unit 113, a subtraction unit 114, a subtraction unit 115, and the control unit 116.

Each unit in FIG. 2 may be implemented in a software manner by causing a computer to execute a program, and may be implemented in a hardware manner by being configured in a dedicated circuit.

The flow rate acquisition unit 111 acquires the air flow rate of the boost compressor 35 on the basis of a pressure ratio of the boost compressor and an IGV (Inlet Guide Vane) opening degree of the boost compressor. The pressure ratio of the boost compressor herein means a ratio of the air pressure at the outlet to the air pressure at the inlet of the boost compressor 35. In addition, the IGV opening degree of the boost compressor herein means an opening degree of an IGV included in the boost compressor 35.

For example, the flow rate acquisition unit 111 stores in advance a table in which the pressure ratio of the boost compressor, the IGV of the boost compressor, and the air flow rate are associated with each other. The flow rate acquisition unit 111 acquires the air flow rate by reading the air flow rate corresponding to the acquired pressure ratio of the boost compressor and the acquired IGV of the boost compressor from the table.

The efficiency acquisition unit 112 acquires the efficiency of the boost compressor 35 on the basis of the air flow rate of the boost compressor 35 and the IGV opening degree of the boost compressor.

For example, the efficiency acquisition unit 112 stores in advance a table in which the air flow rate of the boost compressor 35, the IGV opening degree of the boost compressor, and the efficiency are associated with each other. The efficiency acquisition unit 112 acquires the air flow rate by reading the efficiency corresponding to the acquired air flow rate and the acquired IGV opening degree of the boost compressor from the table.

The temperature difference calculation unit 113 calculates the temperature difference between the inlet and the outlet of the boost compressor 35 on the basis of the pressure ratio of the inlet and the outlet of the boost compressor 35 and the IGV opening degree of the boost compressor 35.

For example, the temperature difference calculation unit 113 calculates the temperature difference between the inlet temperature setting value and the outlet temperature setting value of the boost compressor 35 on the basis of Equation (1).

$$\frac{T_2}{T_1} = \left(\frac{P_2}{P_1}\right)^{\frac{n-1}{n}} \quad (1)$$

T1 represents the inlet temperature of the boost compressor 35. T2 represents the outlet temperature of the boost compressor 35. P1 represents the inlet pressure of the boost compressor 35. P2 represents the outlet pressure of the boost compressor 35. n represents the number of stages of the compressor in the boost compressor 35.

The temperature difference calculation unit 113 substitutes the inlet pressure, the outlet pressure, and the number of compressor stages of the boost compressor 35 respectively for P1, P2, and n and substitutes the outlet temperature setting value of the boost compressor 35 for P2 so as to calculate the inlet temperature setting value of the boost compressor 35.

The subtraction unit 114 subtracts the temperature difference between the inlet and the outlet of the boost compressor 35 from the outlet temperature setting value of the boost compressor 35 so as to calculate the inlet temperature setting value of the boost compressor 35 (the outlet temperature setting value of the cooler 31).

The subtraction unit 114 corresponds to an example of a temperature information calculation unit. The inlet temperature, setting value of the boost compressor 35 calculated by the subtraction unit 114 corresponds to an example of temperature information for feedback control for at least one of the inlet and the outlet of the boost compressor 35.

The subtraction unit 115 subtracts the outlet temperature measurement value of the cooler 31 from the inlet temperature setting value of the boost compressor 35 that is calculated by the subtraction unit 114 so as to calculate the deviation.

The control unit 116 performs feedback control by using the temperature information for feedback control calculated by the subtraction unit 114 such that the inlet temperature of the boost compressor 35 approaches the setting value (so as to the deviation calculated by the subtraction unit 115 approaches 0). As the feedback control performed by the control unit 116, various kinds of control according to the characteristics of the plant, such as PI control or PID control can be used.

As described above, the temperature difference calculation unit 113 calculates the temperature difference between the inlet and the outlet of the boost compressor 35 on the basis of the pressure ratio of the inlet and the outlet of the boost compressor 35, which outputs cooling air obtained by cooling the compressed air from the GT compressor 11 to a cooling target, and the IGV opening degree of the boost compressor 35.

In addition, the subtraction unit 114 calculates the temperature information for feedback control for at least one of the inlet and the outlet of the boost compressor 35 on the basis of the temperature difference between the inlet and the outlet of the boost compressor 35.

Then, the control unit 116 performs feedback control by using the temperature information for feedback control such that at least one of the inlet temperature and the outlet temperature of the boost compressor 35 approaches the setting value.

More specifically, the subtraction unit 114 calculates the inlet temperature setting value of the boost compressor 35 on the basis of the outlet temperature setting value of the boost compressor 35 and the temperature difference between the inlet and the outlet of the boost compressor 35.

Then, the control unit 116 performs feedback control such that the inlet temperature of the boost compressor 35 approaches the setting value.

In this manner, the gas turbine control device 100 can perform control in which the outlet temperature of the boost compressor 35 is reflected by using a temperature measurement value of the inlet of the boost compressor 35 which has higher responsiveness than that of the outlet of the boost compressor 35.

Specifically, the gas turbine control device 100 can perform control in which the outlet temperature setting value of the boost compressor 35 is reflected by using the temperature measurement value of the inlet of the boost compressor 35.

According to the gas turbine control device 100, it is possible to more accurately perform temperature control in the points of using the measurement value which has relatively high responsiveness, and of performing control in which the outlet temperature of the boost compressor 35 (that is, the temperature of the cooling air) is reflected.

In addition, the gas turbine control device 100 does not use a measurement value of the BC-outlet thermometer 42 for the temperature control of the cooling air. Accordingly, the BC-outlet thermometer 42 is not necessarily provided in plural, and thus the configuration can be simplified. In a case where it is unnecessary to measure the outlet temperature of the boost compressor 35 even for the monitoring, the BC-outlet thermometer 42 is not necessary, and thus the configuration can be further simplified.

Second Embodiment

Figure 3:
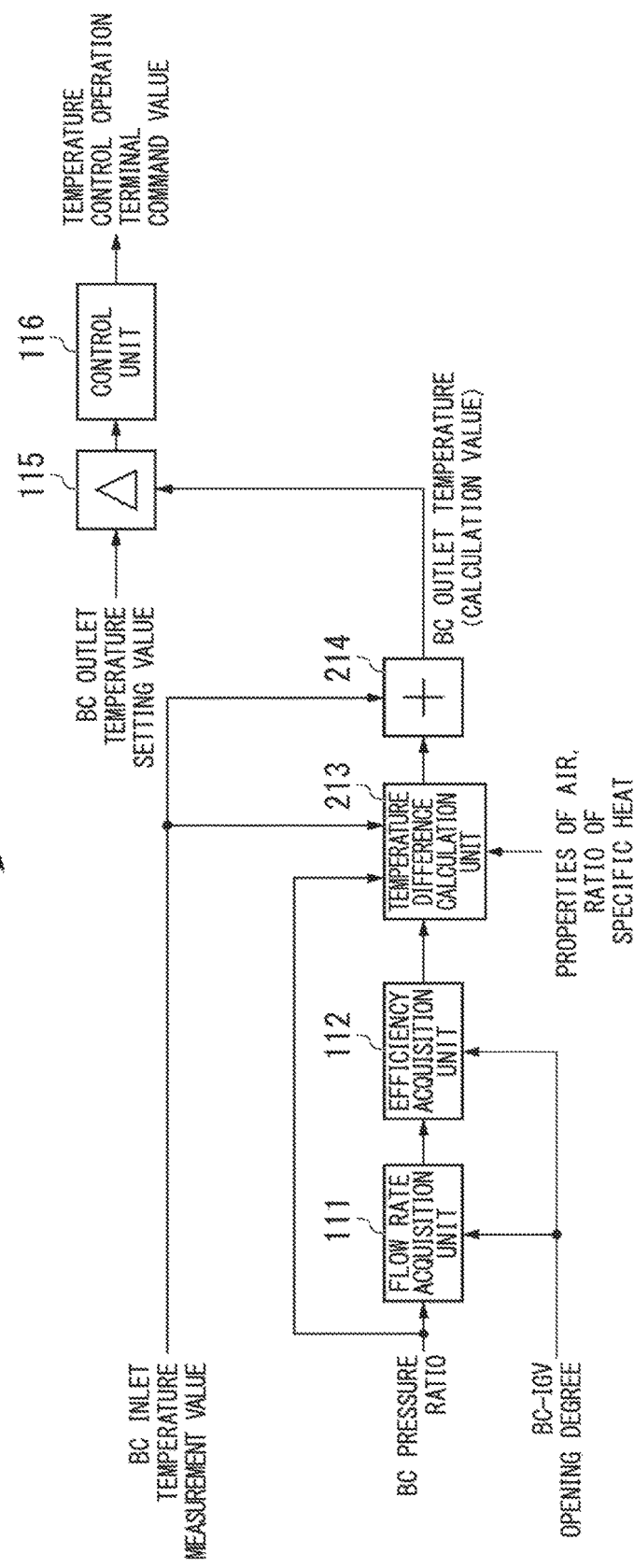
FIG. 3 is a schematic block diagram illustrating a configuration of a part for performing temperature control at the time of obtaining cooling air in a gas turbine control device according to a second embodiment of the invention.

FIG. 3 is a schematic block diagram illustrating a configuration of a part for performing temperature control at the time of obtaining cooling air in a gas turbine control device according to a second embodiment of the invention. In FIG. 3, a gas turbine control device 200 includes the flow rate acquisition unit 111, the efficiency acquisition unit 112, a temperature difference calculation unit 213, an adding unit 214, the subtraction unit 115, and the control unit 116. Similarly to the case of FIG. 2, each unit in FIG. 3 may be implemented in a software manner by causing a computer to execute a program, and may be implemented in a hardware manner by being configured in a dedicated circuit.

In FIG. 3, the part having a similar function corresponding to each unit in FIG. 2 is given the same reference numeral (111, 112, 115, or 116) and the description is omitted. In addition, in the embodiment, for the gas turbine plant which is a control target of the gas turbine control device 200, the gas turbine control device 100 in FIG. 1 is replaced with the gas turbine control device 200.

Similarly to the temperature difference calculation unit 113, the temperature difference calculation unit 213 calculates the temperature difference between the inlet and the outlet of the boost compressor 35 on the basis of the pressure ratio of the inlet and the outlet of the boost compressor 35 and the IGV opening degree of the boost compressor 35. However, the temperature difference calculation unit 213 acquires the inlet temperature measurement value of the boost compressor 35 so as to calculate the temperature difference between the inlet temperature measurement value and the outlet temperature calculation value.

The adding unit 214 adds the temperature difference between the inlet and the outlet of the boost compressor 35 to the inlet temperature measurement value of the boost compressor 35 so as to calculate the outlet temperature calculation value of the boost compressor 35. The outlet temperature calculation value calculated by the adding unit 214 simulates the outlet temperature measurement value.

The processes performed by the subtraction unit 115 and the control unit 116 are similar to those in the ease of the gas turbine control device 100, but the subtraction unit 115 acquires the setting value and the measurement value of the outlet temperature of the boost compressor 35 instead of the setting value and the measurement value of the outlet temperature of the cooler 31. In doing so, the control unit 116 performs control of the outlet temperature of the boost compressor 35.

In this manner, the control unit 116 performs feedback control such that the outlet temperature of the boost compressor 35, which is calculated by the temperature difference calculation unit 213, approaches the setting value.

As described above, the temperature difference calculation unit 213 calculates the temperature difference between the inlet and the outlet of the boost compressor 35 on the basis of the pressure ratio of the inlet and the outlet of the boost compressor 35, which outputs cooling air obtained by cooling the compressed air from the GT compressor 11 to a cooling target, and the IGV opening degree of the boost compressor 35.

In addition, the adding unit 214 calculates the temperature information for feedback control for at least one of the inlet and the outlet of the boost compressor 35 on the basis of the temperature difference between the inlet and the outlet of the boost compressor 35.

Then, the control 116 performs feedback control by using the temperature information for feedback control such that at least one of the inlet temperature and the outlet temperature of the boost compressor 35 approaches the setting value.

More specifically, the adding unit 214 calculates the outlet temperature of the boost compressor 35 on the basis of the inlet temperature measurement value of the boost compressor 35 and the temperature difference between the inlet and the outlet of the boost compressor 35.

Then, the control unit 116 performs feedback control such that the outlet temperature of the boost compressor 35, which is calculated by the adding unit 214, approaches the setting value.

The gas turbine control device 200 can perform control in which the outlet temperature of the boost compressor 35 is reflected by using the temperature measurement value of the inlet, of the boost compressor 35 which has higher responsiveness than that of the outlet of the boost compressor 35.

Specifically, the gas turbine control device 200 can perform control in which the outlet temperature setting value of the boost compressor 35 is reflected by using the inlet temperature measurement value of the boost compressor 35.

According to the gas turbine control device 200, it is possible to more accurately perform temperature control in the points of using the measurement value which has relatively high responsiveness, and of performing control in which the outlet temperature of the boost compressor 35 is reflected (that is, the temperature of the cooling air).

Third Embodiment

Figure 4:
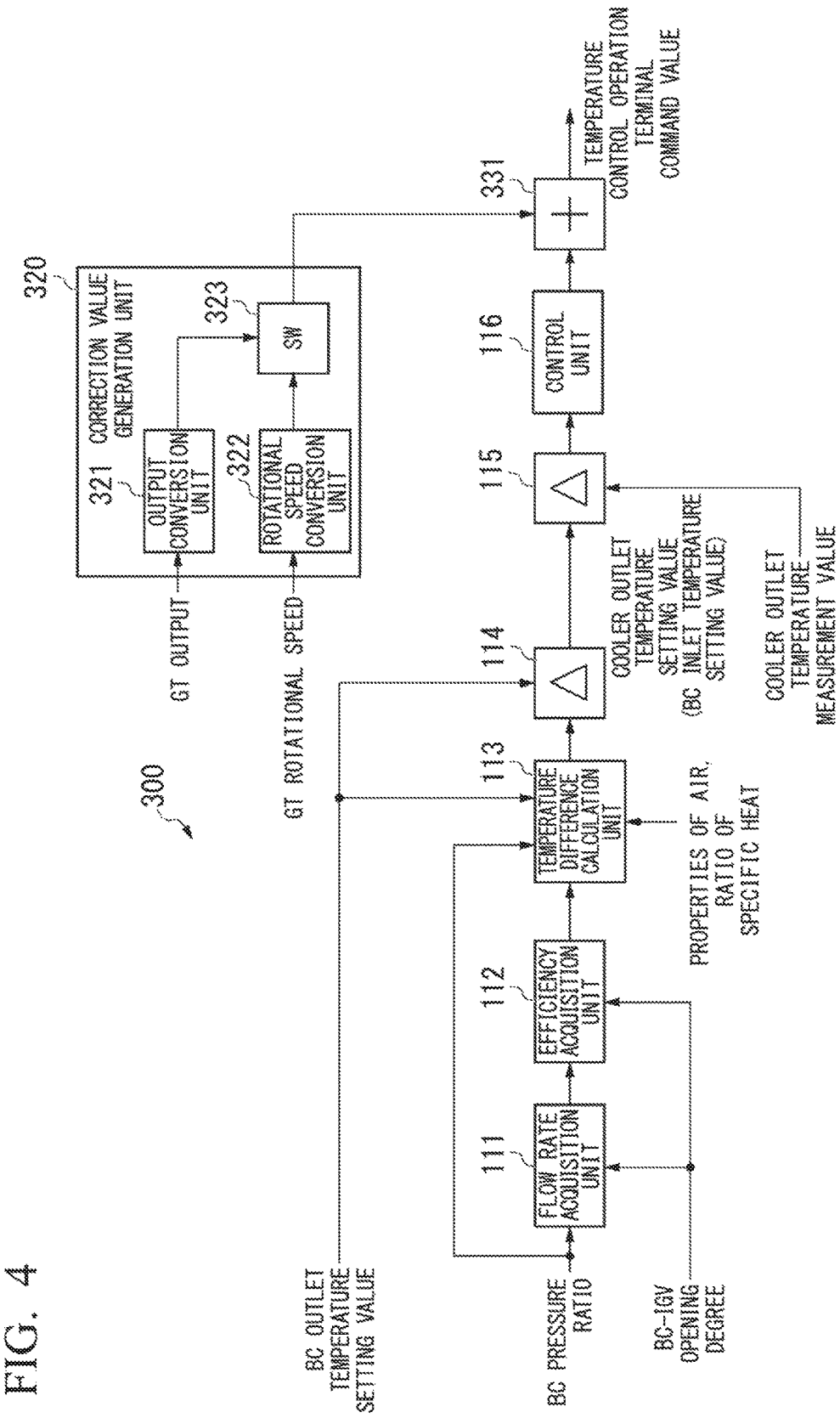
FIG. 4 is a schematic block diagram illustrating a configuration of a part for performing temperature control at the time of obtaining cooling air in a gas turbine control device according to a third embodiment of the invention.

FIG. 4 is a schematic block diagram illustrating a configuration of a part for performing temperature control at the time of obtaining cooling air in a as turbine control device according to a third embodiment of the invention. In FIG. 4, a gas turbine control device 300 includes the flow rate acquisition unit 111, the efficiency acquisition unit 112, the temperature difference calculation unit 113, the subtraction unit 114, the subtraction unit 115, the control unit 116, a correction value generation unit 320, and an adding unit 331. The correction value generation unit 320 includes an output conversion unit 321, a rotational speed conversion unit 322, and a switching unit 323. Similarly to each unit of FIG. 2, each unit in FIG. 4 may be implemented in a software manner by causing a computer to execute a program, and may be implemented in hardware manner by being configured in a dedicated circuit.

In FIG. 4, the part having a similar function corresponding to each unit in FIG. 2 is given the same reference numeral (111 to 116) and the description is omitted. In addition, in the embodiment, for the gas turbine plant which is a control target of the gas turbine control device 300, the gas turbine control device 100 in FIG. 1 is replaced with the gas turbine control device 300.

The correction value generation unit 320 generates a correction value for a control command value which is output from the control unit 116, on the basis of information indicating an operation status of the GT compressor 111.

Hereinafter, a case in which the correction value generation unit 320 acquires the output value of the gas turbine 10 (more specifically, a power generation output value of the generator 21) or the rotational speed of the gas turbine 10, as the information indicating the operation status of the GT compressor 11 will be described as an example, but the invention is not limited thereto. As the information indicating the operation status of the GT compressor 11 that the correction value generation unit 320 acquires, various signals which cause a change in a casing temperature of the GT compressor 11, such as a fuel control signal or an IGV control signal of the GT compressor 11 can be used.

The output conversion unit 321 converts the output value of the gas turbine 10 to the correction value. For example, the output conversion unit 321 stores, in advance, a table in which the output value of the gas turbine 10 and the correction value for the control command value from the control unit 116 are associated with each other. Then, the output conversion unit 321 converts the output value of the gas turbine 10 to the correction value by reading the correction value corresponding to the obtained output value of the gas turbine 10 from the table.

The rotational speed conversion unit 322 converts the rotational speed of the gas turbine 10 to the correction value. For example, the rotational speed conversion unit 322 stores in advance a table in which the rotational speed of the gas turbine 10 and the correction value for the control command value from the control unit 116 are associated with each other. Then, the rotational speed conversion unit 322 converts the rotational speed of the gas turbine 10 to the correction value by reading the correction value corresponding to the obtained rotational speed of the gas turbine 10 from the table.

The switching unit 323 performs switching between the correction value output from the output conversion unit 321 and the correction value output from the rotational speed conversion unit 322. Specifically, during the load operation of the gas turbine 10, the switching unit 323 outputs the correction value from the output conversion unit 321. Meanwhile, in a state where the output from the generator is zero, such as the speed up of the gas turbine 10, the switching unit 323 outputs the correction value from the rotational speed conversion unit 322.

The adding unit 331 corrects the control command value from the control unit 116 by using the correction value from the switching unit 323.

Figure 5:
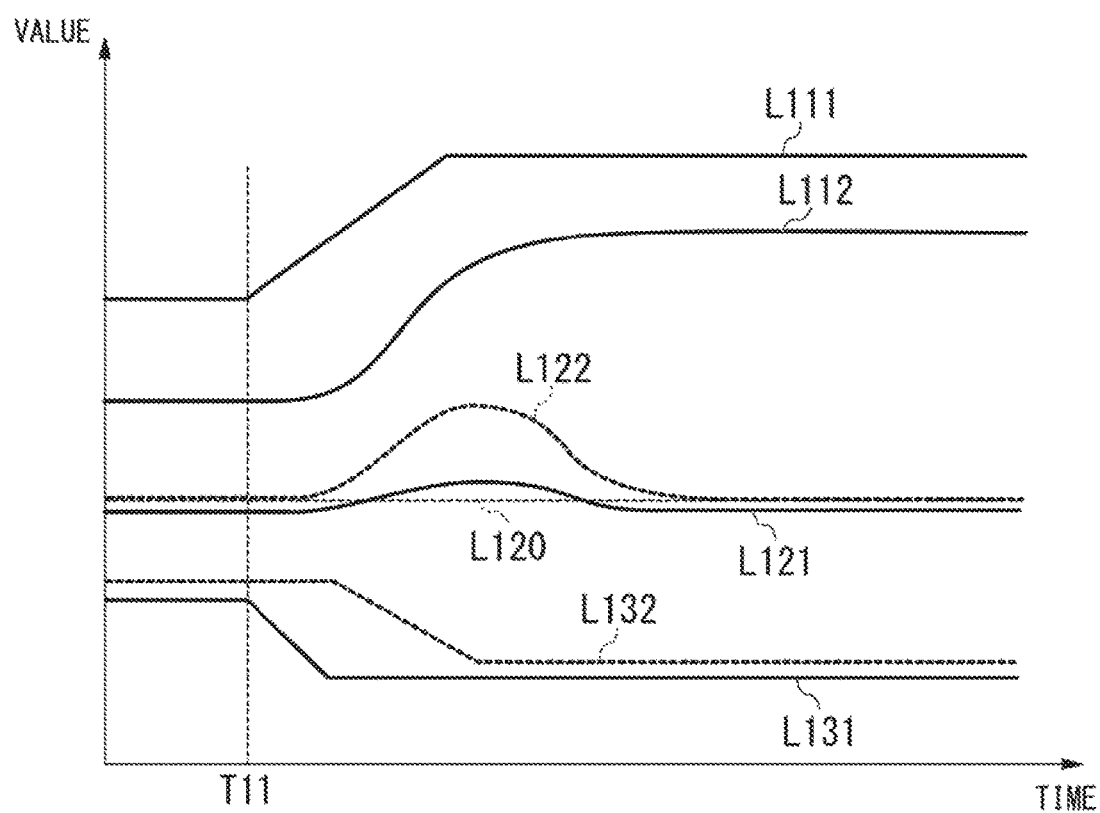
FIG. 5 is an explanatory diagram illustrating, an example of control by the gas turbine control device according to the third embodiment.

FIG. 5 is an explanatory diagram illustrating an example of control by the gas turbine control device 300.

In FIG. 5, the horizontal axis indicates time and the vertical axis indicates values (respective values of output, temperature, and opening degree).

A line L111 indicates the output of the gas turbine 10. A line L112 indicates a casing temperature of the turbine 13.

A line L120 indicates the setting value of the outlet temperature of the boost compressor 35 (the temperature of cooling air). A line L121 indicates the measurement value of the outlet temperature of the boost compressor 35. A line L122 indicates the measurement of the outlet temperature of the boost compressor 35 in a case where feedback control is performed by using the setting value and the measurement value of the outlet temperature of the boost compressor 35.

A line L131 indicates the opening degree of the cooler bypass valve 33. A line L132 indicates the opening degree of the cooler bypass valve 33 in a case where feedback control is performed by using the setting value and the measurement value of the outlet temperature of the boost compressor 35.

At time T11, the output of the gas turbine 10 (the line L111) starts to be increased, and, according to this increase, the casing temperature of the turbine 13 (the line L112) is increased. According to the increase in the casing temperature, the inlet temperature of the cooler 31 is increased.

In a ease where feedback control is performed by using the setting temperature and the measurement value of the outlet temperature of the boost compressor 35, the opening degree of the cooler bypass valve 33 (the line L132) is gradually reduced after the outlet temperature of the boost compressor 35 (the line L120) starts to be increased. Therefore, the outlet temperature of the boost compressor 35 approaches the setting value (the line L120) by the feedback control after being increased to some extent.

In contrast, in a case where control is performed by each unit illustrated in FIG. 4, the adding unit 331 corrects the control command value from the control unit 116 on the basis of the output and the rotational speed of the gas turbine 10 so that the opening degree of the cooler bypass valve 33 (the line L131) can be feedforward controlled without waiting for the increase of the casing temperature (the line L112). In addition, the subtraction unit 114 calculates the outlet temperature setting value of the cooler 31 so that the control unit 116 can perform feedback control on the outlet temperature of the cooler 31 which has higher responsiveness than that of the outlet temperature of the boost compressor 35.

In this manner, the gas turbine control device 300 can perform control of the temperature control operation terminals such as the opening degree of the cooler bypass valve 33 at a timing earlier than that of a case where the feedback control is performed by using the setting value and the measurement value of the outlet temperature of the boost compressor 35. In this manner, it is possible to decrease the deviation relative to the setting value of the outlet temperature of the boost compressor 35 similar to the line L121.

That is, the gas turbine control device 300 can accurately perform control of the outlet temperature of the boost compressor 35 (temperature control of cooling air).

As described above, the correction value generation unit 320 generates the correction value for the control command value which is output from the control unit 116, on the basis of the information indicating the operation status of the GT compressor 11. Then, the adding unit 331 corrects the control command value by using the correction value generated by the correction value generation unit 320.

In doing so, the gas turbine control device 300 can perform feedforward control on the temperature control operation terminals on the basis of the information indicating the operation status of the GT compressor 11. In particular, the gas turbine control device 300 can perform feedforward control on the temperature control operation terminals before the casing temperature of the gas turbine 10 (the inlet temperature of the cooler 31) is increased. Accordingly, the gas turbine control device 300 can accurately perform control of the outlet temperature of the boost compressor 35 (temperature control of cooling air).

Hereinbefore, the feedforward control according to the third embodiment has been described in combination with the first embodiment, but the first embodiment is not essential in the third embodiment.

For example, the feedforward control according to the third embodiment can be implemented in combination with the second embodiment. Specifically, in FIG. 4, the subtraction unit 115 acquires a target temperature of the cooling air as the outlet temperature setting value of the boost compressor 35, instead of the outlet temperature setting value of the cooler 31, which is calculated by the subtraction unit 114. In addition, the subtraction unit 115 acquires the outlet temperature (the calculation value) of the boost compressor 35, which is calculated by the adding unit 214 (FIG. 3), instead of the outlet temperature measurement value of the cooler 31. In this manner, the feedforward control based on the information indicating the operation status of the turbine 13 can be combined with the feedback control performed by the gas turbine control device 200 (FIG. 3).

Furthermore, the feedforward control according to the third embodiment can be implemented independently from the first embodiment or the second embodiment. For example, in FIG. 4, the subtraction unit 115 acquires the target temperature of the cooling air as the outlet temperature setting value of the boost compressor 35 and may acquire the outlet temperature setting value of the boost compressor 35.

Fourth Embodiment

Figure 6:
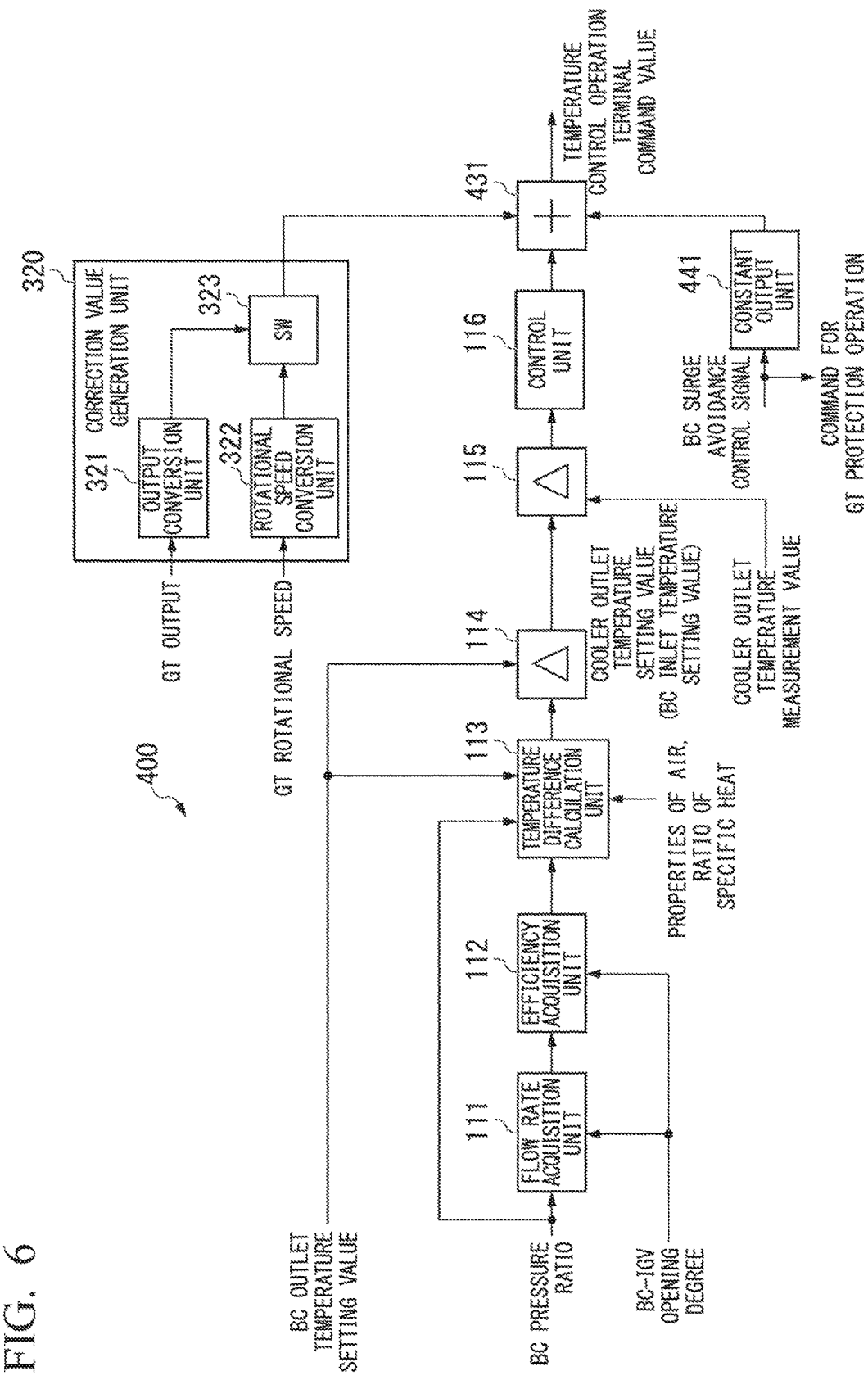
FIG. 6 is a schematic block diagram illustrating a configuration of a part for performing temperature control at the time of obtaining cooling air in a gas turbine control device according to a fourth embodiment of the invention.

FIG. 6 is a schematic block diagram illustrating a configuration of a part for performing temperature control at the time of obtaining cooling air in a gas turbine control device according to a fourth embodiment of the invention. In FIG. 6, a gas turbine control device 400 includes the flow rate acquisition unit 111, the efficiency acquisition unit 112, the temperature difference calculation unit 113, the subtraction unit 114, the subtraction unit 115, the control unit 116, the correction value generation unit 320, an adding unit 431, and a constant output unit 441. The correction value generation unit 320 includes the output conversion unit 321, the rotational speed conversion unit 322, and the switching unit 323. Similarly to each unit of FIG. 4, each unit in FIG. 6 may be implemented in a software manner by causing a computer to execute a program, and may be implemented in a hardware manner by being configured in a dedicated circuit.

In FIG. 6, the part having a similar function corresponding to each unit in FIG. 4 is given the same reference numeral (111 to 116 and 320 to 324) and the description is omitted. In addition, in the embodiment, for the gas turbine plant which is a control target of the gas turbine control device 300, the gas turbine control device 100 in FIG. 1 is replaced with the gas turbine control device 300.

The constant output unit 441 outputs a constant in case where a surge avoidance control command of the boost compressor 35 is acquired. The constant output unit 441 corresponds to an example of a predetermined value output unit. The constant output from constant output unit 441 corresponds to an example of a predetermined value.

However, the output of the constant output unit 441 is not limited to the constant, and may be various values which cause the opening degree of the anti-surge valve 36 to be increased in order to avoid the surge of the boost compressor 35. For example, the constant output unit 441 stop in advance a function having a time as a parameter, and may output a variable value with the time if the surge avoidance control command of the boost compressor 35 is acquired.

The adding unit 431 corrects the control command value from the control unit 116 by using the predetermined value output from the constant output unit 441. Specifically, the adding unit 431 adds the constant from the constant output unit 441 to the control command value from the control unit 116 so as to correct the control command value such that the outlet temperature of the cooler 31 is further increased.

According to this correction, the gas turbine control device 400 increases the opening degree of the cooler bypass valve 33. If the opening degree of the cooler bypass valve 33 is increased, the inlet temperature of the boost compressor 35 is increased, and the volumetric flow rate of the boost compressor 35 is increased. As the flow rate of the boost compressor 35 is increased, the possibility of the occurrence of the surge is decreased.

The adding unit 431 corresponds to an example of a surge avoidance correction unit. In addition, the adding unit 431 also corresponds to an example of an operation-status correspondence correction unit.

In addition, by increasing the opening degree of the cooler bypass valve 33, the temperature of the cooling air (the outlet temperature of the boost compressor 35) is increased. Therefore, in order to protect the high temperature components, the gas turbine 10 may be operated by runback or trips so as to decrease the temperature of the gas turbine 10. In FIG. 6, the gas turbine control device 400 issues a command for a protection operation of the gas turbine 10 if the surge avoidance control command of the boost compressor 35 is acquired. According to the command, the gas turbine 10 is operated by, for example, runback so as to decrease the temperature of the combustor 12 or the like.

In addition, in a case where the control unit 116 performs control of the fan 32, the inlet temperature of the boost compressor 35 may be increased by stopping the fan 32 or decreasing the rotational speed of the fan 32.

Figure 7:
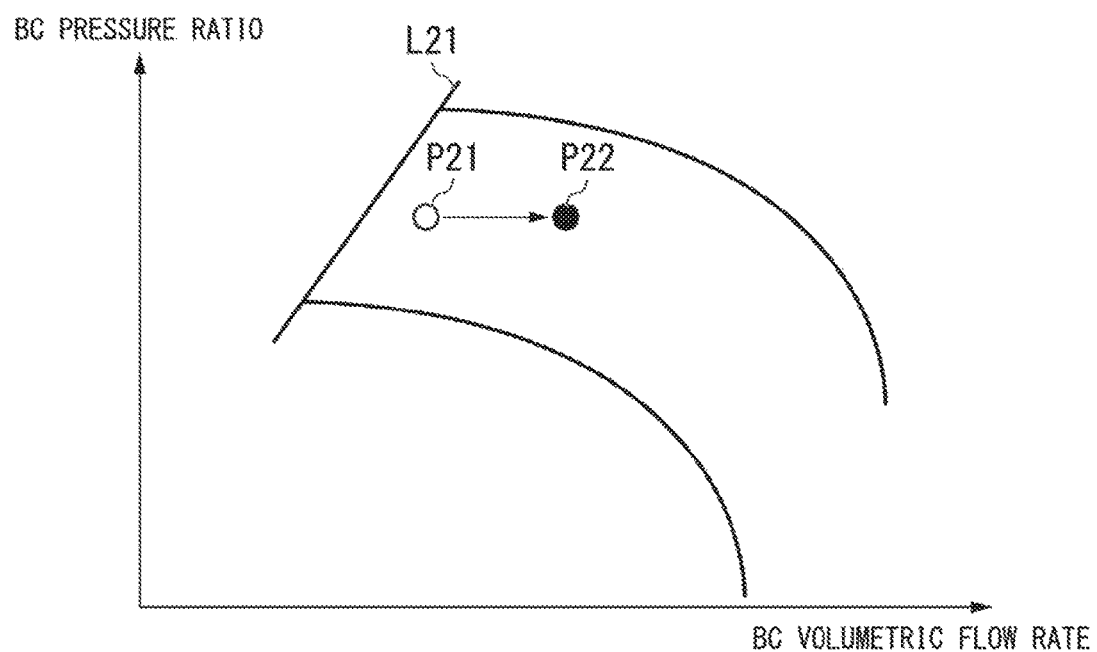
FIG. 7 is an explanatory diagram illustrating an example of a compressor map of a boost compressor according to the fourth embodiment.

FIG. 7 is an explanatory diagram illustrating an example of a compressor map (performance curve) of the boost compressor 35. In FIG. 7, the horizontal axis indicates the volumetric flow rate of the boost compressor 35, and the vertical axis indicates the pressure ratio of the inlet and the outlet of the boost compressor 35 (value obtained by dividing the output pressure by the input pressure). In addition, a line L21 indicates the surge line.

If the boost compressor 35 enters a state indicated by a point P21 so that the surge avoidance control command is issued, the constant output unit 441 outputs a constant, and the adding unit 431 adds the constant from the constant output unit 441 to the control command value from the control unit 116. Accordingly, the opening degree of the cooler bypass valve 33 is increased and thus the flow rate of the boost compressor 35 is increased. According to the increase of the flow rate, the boost compressor 35 enters a state indicated by a point P22. The point P22 is at a position away from the surge line further than the point P21. Accordingly, the possibility of the occurrence of the surge in the boost compressor 35 is decreased.

As described above, the constant output unit 441 outputs a predetermined value if the surge avoidance control command of the boost compressor 35 is acquired. Then, the adding unit 431 corrects the control command value from the control unit 116 by using the predetermined value from the constant output unit 441.

Accordingly, the gas turbine control device 400 can increase the inlet temperature of the boost compressor 35 by increasing the opening degree of the cooler bypass valve 33. By increasing the inlet temperature of the boost compressor 35, the volumetric flow rate of the boost compressor 35 is increased, and thus the possibility of the occurrence of the surge can be reduced.

Hereinbefore, the surge avoidance control according to the fourth embodiment has been described in combination with the third embodiment, but the third embodiment is not essential in the fourth embodiment.

The surge avoidance control according to the fourth embodiment can be implemented in combination with any of the first embodiment and the second embodiment, and the surge avoidance control according to the fourth embodiment can be implemented independently from any of the first embodiment to the third embodiment.

Further, the gas turbine control device according to any of the embodiments described above may perform feedback control such that both of the inlet temperature and the outlet temperature of the boost compressor respectively approach the setting values. For example, in the first embodiment, the gas turbine control device 100 may perform feedback control of the outlet temperature of the boost compressor described in the second embodiment in addition to the feedback control of the inlet temperature of the boost compressor described in the first embodiment.

In addition, processes of the respective units may be performed by recording a program for implementing all or some of functions of the gas turbine control device 100, 200, 300, or 400 in a computer readable recording medium, and by causing a computer system to read and execute the program recorded in the recording medium. The "computer system" herein includes an OS or hardware such as peripheral equipment.

In addition, the "computer system" includes a homepage providing environment (or a homepage displaying environment) in a case where the WWW system is used.

In addition, the "computer readable recording medium" refers to a portable medium such as a flexible disk, a magneto-optical disk, ROM, or a CD-ROM and a recording device such as a hard disc equipped in a computer system. Further, the "computer readable recording medium," includes one that dynamically holds the program for a short period of time such as a communication line in a case where the program is transmitted through a network such as the Internet or a communication channel such as a telephone line, and one that holds the program for a certain time such as volatile memory in the computer system as a client or a server in a case where the program is transmitted through a network such as the Internet or a communication channel such as a telephone line. Further, the program may implement part of the functions described above, and may implement the functions described above in combination with a program recorded in advance in the computer system.

The embodiments of the invention have been described with reference to the drawings, but the specific configuration is not limited to these embodiments, and design changes without departing from the gist of the invention are also included.

INDUSTRIAL APPLICABILITY

The present invention relates to a temperature control device including: a temperature difference calculation unit that calculates a temperature difference between an inlet and an outlet of a boost compressor on the basis of a pressure ratio of the inlet and the outlet of the boost compressor and an IGV opening degree of the boost compressor, the boost compressor outputting cooling air obtained by cooling compressed air from a compressor to a cooling target; a temperature information calculation unit that calculates temperature information for feedback control for at least one of the inlet and the outlet of the boost compressor on the basis of the temperature difference between the inlet and the outlet of the boost compressor; and a control unit that performs feedback control by using the temperature information for feedback control such that at least one of an inlet temperature and an outlet temperature of the boost compressor approaches a setting value.

According to the invention, it is possible to more accurately perform temperature control at the time of obtaining cooling air by boosting compressed air from a compressor such as a gas turbine compressor, by a boost compressor after cooling using a cooler.

REFERENCE SIGNS LIST

1 Gas turbine plant
10 Gas turbine
11 GT compressor
12 Combustor
13 Turbine
14 Shaft
21 Generator
31 Cooler
32 Fan
33 Cooler bypass valve
34 Mist separator
35 Boost compressor
36 Anti-surge valve
41 Cooler-outlet thermometer
42 BC-outlet thermometer
100, 200, 300, 400 Gas turbine control device
111 Flow rate acquisition unit
112 Efficiency acquisition unit
113, 213 Temperature difference calculation unit
114, 115 Subtraction unit
116 Control unit
214, 331, 431 Adding unit
320 Correction value generation unit
321 Output conversion unit
322 Rotational speed conversion unit
323 Switching unit
441 Constant output unit

The invention claimed is:

1. A temperature control device comprising:
a temperature difference calculation unit that calculates a temperature difference between an inlet and an outlet of a boost compressor on the basis of a pressure ratio of the inlet and the outlet of the boost compressor and an opening degree of an inlet guide vane of the boost compressor, the boost compressor outputting cooling air obtained by cooling compressed air from a compressor to a cooling target;
a temperature information calculation unit that calculates temperature information for feedback control for at least one of the inlet and the outlet of the boost compressor on the basis of the temperature difference between the inlet and the outlet of the boost compressor; and
a control unit that performs feedback control of at least one of an inlet temperature of the boost compressor and an outlet temperature of the boost compressor by using the temperature information for feedback control such that at least one of an inlet temperature and an outlet temperature of the boost compressor approaches a setting value.

2. The temperature control device according to claim 1, wherein the temperature information calculation unit calculates an inlet temperature setting value of the boost compressor on the basis of an outlet temperature setting value of the boost compressor and the temperature difference between the inlet and the outlet of the boost compressor, and
wherein the control unit performs feedback control such that the inlet temperature of the boost compressor approaches the setting value.

3. The temperature control device according to claim 1, wherein the temperature information calculation unit calculates the outlet temperature of the boost compressor on the basis of an inlet temperature measurement value of the boost compressor and the temperature difference between the inlet and the outlet of the boost compressor, and
wherein the control unit performs feedback control such that the outlet temperature of the boost compressor calculated by the temperature information calculation unit approaches the setting value.

4. The temperature control device according to claim 1, further comprising:
a correction value generation unit that generates a correction value for a control command value which is output from the control unit, on the basis of information indicating an operation status of the compressor; and
an operation-status correspondence correction unit that corrects the control command value by using the correction value.

5. The temperature control device according to claim 1, further comprising:
a predetermined value output unit that outputs a predetermined value in a case where a surge avoidance control command of the boost compressor is acquired; and
a surge avoidance correction unit that corrects the control command value by using the predetermined value.

6. A gas turbine comprising the temperature control device according to claim 1.

7. A temperature control method comprising:
a temperature difference calculation step of calculating a temperature difference between an inlet and an outlet of a boost compressor on the basis of a pressure ratio of the inlet and the outlet of the boost compressor and an opening degree of an inlet guide vane of the boost compressor, the boost compressor outputting cooling air obtained by cooling compressed air from a compressor to a cooling target;
a temperature information calculation step of calculating temperature information for feedback control for at least one of the inlet and the outlet of the boost compressor on the basis of the temperature difference between the inlet and the outlet of the boost compressor; and
a control step of performing feedback control of at least one of an inlet temperature of the boost compressor and an outlet temperature of the boost compressor by using the temperature information for feedback control such that at least one of an inlet temperature and an outlet temperature of the boost compressor approaches a setting value.

8. A non-transitory computer-readable recording medium storing a program causing a computer to execute:
a temperature difference calculation step of calculating a temperature difference between an inlet and an outlet of a boost compressor on the basis of a pressure ratio of the inlet and the outlet of the boost compressor and an opening degree of an inlet guide vane of the boost compressor, the boost compressor outputting cooling air obtained by cooling compressed air from a compressor to a cooling target;

a temperature information calculation step of calculating temperature information for feedback control for at least one of the inlet and the outlet of the boost compressor on the basis of the temperature difference between the inlet and the outlet of the boost compressor; and a control step of performing feedback control of at least one of an inlet temperature of the boost compressor and an outlet temperature of the boost compressor by using the temperature information for feedback control such that at least one of an inlet temperature and an outlet temperature of the boost compressor approaches a setting value.

* * * * *